US008625522B2

(12) United States Patent
McCoy et al.

(10) Patent No.: US 8,625,522 B2
(45) Date of Patent: *Jan. 7, 2014

(54) TECHNIQUES FOR RESOURCE BLOCK MAPPING IN A WIRELESS COMMUNICATION SYSTEM

(75) Inventors: James W. McCoy, Austin, TX (US); Ning Chen, Austin, TX (US); Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/526,419

(22) Filed: Jun. 18, 2012

(65) Prior Publication Data

US 2012/0257594 A1    Oct. 11, 2012

Related U.S. Application Data

(63) Continuation of application No. 11/766,888, filed on Jun. 22, 2007, now Pat. No. 8,204,008.

(51) Int. Cl.
*H04W 4/00* (2009.01)
*H04W 72/00* (2009.01)
*H04J 1/00* (2006.01)
*H04L 12/28* (2006.01)

(52) U.S. Cl.
USPC ......... 370/329; 370/343; 370/351; 455/452.2

(58) Field of Classification Search
USPC ....................................................... 370/329
See application file for complete search history.

(56) References Cited

U.S. PATENT DOCUMENTS

| 6,333,936 | B1 | 12/2001 | Johansson et al. | |
| 7,826,415 | B2 * | 11/2010 | Oh et al. | 370/329 |
| 2005/0135324 | A1 * | 6/2005 | Kim et al. | 370/343 |
| 2007/0010268 | A1 | 1/2007 | Kim et al. | |
| 2007/0259672 | A1 * | 11/2007 | Heo et al. | 455/452.2 |
| 2007/0274288 | A1 * | 11/2007 | Smith et al. | 370/351 |

FOREIGN PATENT DOCUMENTS

KR    10-2006-0016279    2/2006

OTHER PUBLICATIONS

International Search Report and Written Opinion correlating to PCT/US2008/066666, dated Nov. 28, 2008.

* cited by examiner

*Primary Examiner* — Charles Appiah
*Assistant Examiner* — Natasha Cosme
(74) *Attorney, Agent, or Firm* — Paradigm IP Law, PC; Ross L. Franks

(57) ABSTRACT

A technique of operating a wireless communication device includes creating a resource block map by associating respective subscriber station identifications, corresponding to respective subscriber stations, with one or more resource blocks. The respective subscriber station identifications and the resource block map are transmitted, from a serving base station, in one or more control channel symbols.

12 Claims, 9 Drawing Sheets

TECHNIQUES FOR RESOURCE BLOCK MAPPING IN A WIRELESS COMMUNICATION SYSTEM

PRIORITY

This application is a continuation of and claims priority to co-owned U.S. patent application Ser. No. 11/766,888 and entitled "TECHNIQUES FOR RESOURCE BLOCK MAPPING IN A WIRELESS COMMUNICATION SYSTEM", filed Jun. 22, 2007 and issuing as U.S. Pat. No. 8,204,008, the foregoing incorporated herein by reference in its entirety.

BACKGROUND

1. Field

This disclosure relates generally to mapping and, more specifically, to techniques for resource block mapping in a wireless communication system.

2. Related Art

In general, orthogonal frequency division multiplexing (OFDM) systems support high data rate wireless transmission using orthogonal channels; which offer immunity against fading and inter-symbol interference (ISI) without requiring implementation of elaborate equalization techniques. Typically, OFDM systems split data into N streams, which are independently modulated on parallel spaced sub-carrier frequencies or tones. The frequency separation between subcarriers is 1/T, where T is the OFDM symbol time duration. Each symbol may include a guard interval (or cyclic prefix) to maintain the orthogonality of the symbols. In general, OFDM systems have utilized an inverse discrete Fourier transform (IDFT) to generate a sampled (or discrete) composite time-domain signal.

Various wireless networks, such as third-generation partnership project-long term evolution (3GPP-LTE) compliant architectures, may be designed to employ uplink reference signals (RSs) for uplink carrier-to-interference and noise (CINR) estimation, which is used by a scheduler, e.g., a network scheduler, to schedule uplink transmission for user equipment (subscriber stations (SSs)). Respective sequences of the RSs are used to uniquely identify an SS and, when transmitted from the SS to a serving base station (BS), may be used by the serving BS in channel characterization. In general, a scheduler associated with one or more serving BSs utilizes information derived from channel characterization to determine channel allocation for the SSs. The channel allocation, e.g., uplink and downlink assignments, have then been provided to the SSs over a downlink shared control channel (physical downlink control channel (PDCCH)), which typically includes one or more control channel symbols. The one or more control channel symbols are usually transmitted by the serving BS at a beginning of a downlink frame (or sub-frame). Typically, upon receiving the one or more control channels symbols, each of the SSs searches (using, for example, a blind search procedure) the one or more control channel symbols to locate an associated downlink and uplink control channel to determine respective uplink and downlink assignments.

A known control channel downlink scheduling approach has proposed employing a resource block (RB) map in an associated downlink control channel of each SS. According to this approach, a bit is provided in the RB map for each RB that is to be scheduled. An RB may have various lengths, e.g., seven symbols, and correspond to a group of subcarriers, e.g., twelve subcarriers. As one example, in a conventional wireless communication system having a 20 MHz bandwidth, an RB map may employ one-hundred bits to support discontinuous RB assignment. In this case, a given SS searches an associated 100-bit RB map in an associated downlink control channel to determine a location of the RBs assigned to the given SS for downlink communication. For example, a digital one, e.g., a '1', in a bit of the RB map may be used to indicate to an SS that an associated RB is assigned to the SS and a digital zero, e.g., a '0', in a bit of the RB map may be used to indicate to the SS that an associated RB is assigned to another SS (or is unassigned).

With reference to FIG. 1, an example diagram 100 of a relevant portion of a downlink shared control channel that employs a conventional resource block (RB) mapping scheme is illustrated for five SSs (i.e., the SSs denoted as SS1, SS2, SS3, SS4, and SS5). As is shown, each associated downlink control channel (CCH) of the SSs includes an individual RB map that maps all of the RBs in a related wireless communication system. In this case, five-hundred RB mapping bits (i.e., one-hundred RB mapping bits per each of the five SSs) are required to be transmitted (from the serving BS to the five SSs) on a downlink shared control channel. While the number of conventional RB mapping bits may be limited to reduce overhead, reducing the number of RB mapping bits also results in a loss of scheduling gain. That is, reducing the number of conventional RB mapping bits reduces a size of a frequency spectrum that may be utilized for communication which may reduce frequency selectivity (i.e., an ability of a serving BS to choose a best RB or group of RBs for a given SS).

What is needed are techniques for reducing overhead associated with resource block mapping in a downlink shared control channel (of a wireless communication system) that do not adversely affect frequency selectivity.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
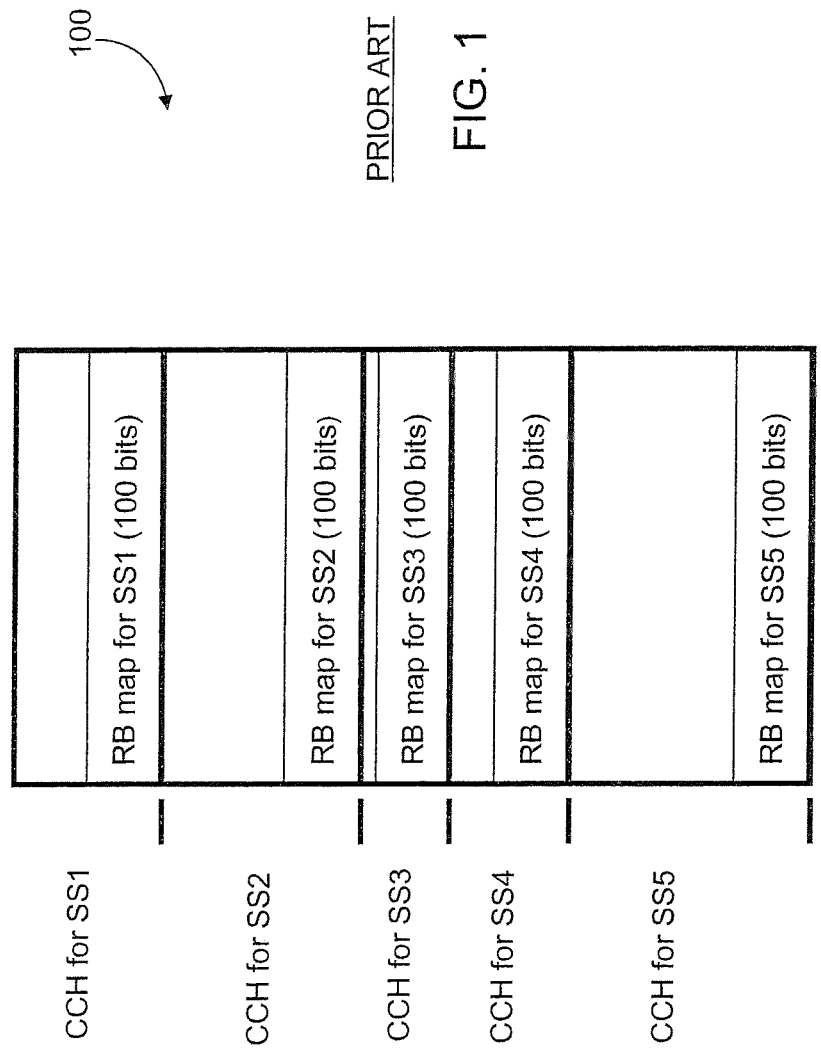
FIG. 1 is an example diagram of a relevant portion of a downlink shared control channel that employs a conventional resource block (RB) mapping scheme, where an associated downlink control channel of each subscriber station (SS) includes an associated RB map.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a subscriber station, such as a cellular handset, it will be appreciated that the present invention is not so limited and may be embodied in various devices, e.g., personal digital assistants (PDAs), digital cameras, portable storage devices, audio players, computer systems, and portable gaming devices, for example.

As is used herein, the term "user equipment" is synonymous with the term "subscriber station," which is used to broadly denote a wireless device associated with a wireless communication system. As is also used herein, the term "control channel symbol" includes a symbol that occupies a channel, which may occupy an entire system bandwidth or a portion of the entire system bandwidth. The term "channel," as used herein, includes one or more subcarriers, which may or may not be adjacent. As may be used herein, the term "slot" refers to a symbol location in a multiple access signal. The term "blind search procedure" is used herein to refer to a search procedure in which a searcher, e.g., an SS, has no prior knowledge of a location of an item searched for in a sequence of items. For example, when an SS is searching one or more control channel symbols (of a downlink shared control channel) for an associated control channel, the SS does not have prior knowledge of the location of the associated control channel in the one or more control channel symbols when a blind search procedure is employed.

According to various aspects of the present disclosure, a control channel scheduling technique is employed that generally reduces overhead associated with transmitting a resource block (RB) map (from a serving base station (BS) to subscriber stations (SSs) in a wireless communication system), while maintaining frequency selectivity. The various techniques reduce overhead by reducing the number of associated RB mapping bits that are used for an RB map in a downlink shared control channel. Reducing the number of associated RB mapping bits also generally reduces decoding complexity of the downlink shared control channel at the SSs, as there are less associated RB mapping bits to decode. As such, a search routine, e.g., a blind search procedure, employed at an SS has less bits to search. In general, the disclosed techniques employ a unique SS identification (ID) or index for each SS. A bit size of the SS ID may be chosen based on the number of active SSs, e.g., for sixteen active SSs an SS ID having a bit size of 4-bits may be employed. As another example, in a cell having twenty active SSs, a serving BS may select an SS ID having 5-bits. In general, a bit size of an SS ID may be chosen as a rounded-up integer of $\log_2$(# of active SSs). Alternatively, a size of an SS ID may be statically selected based on a maximum number of active SSs that a serving BS may service in a cell. For example, in a cell having forty maximum active SSs, a 6-bit SS ID may be employed. In various disclosed techniques, SS IDs are mapped to RBs with (N+M)* rounded-up integer($\log 2(M)$) bits, where N is the number of RBs and M is the number of SSs.

Figure 5:
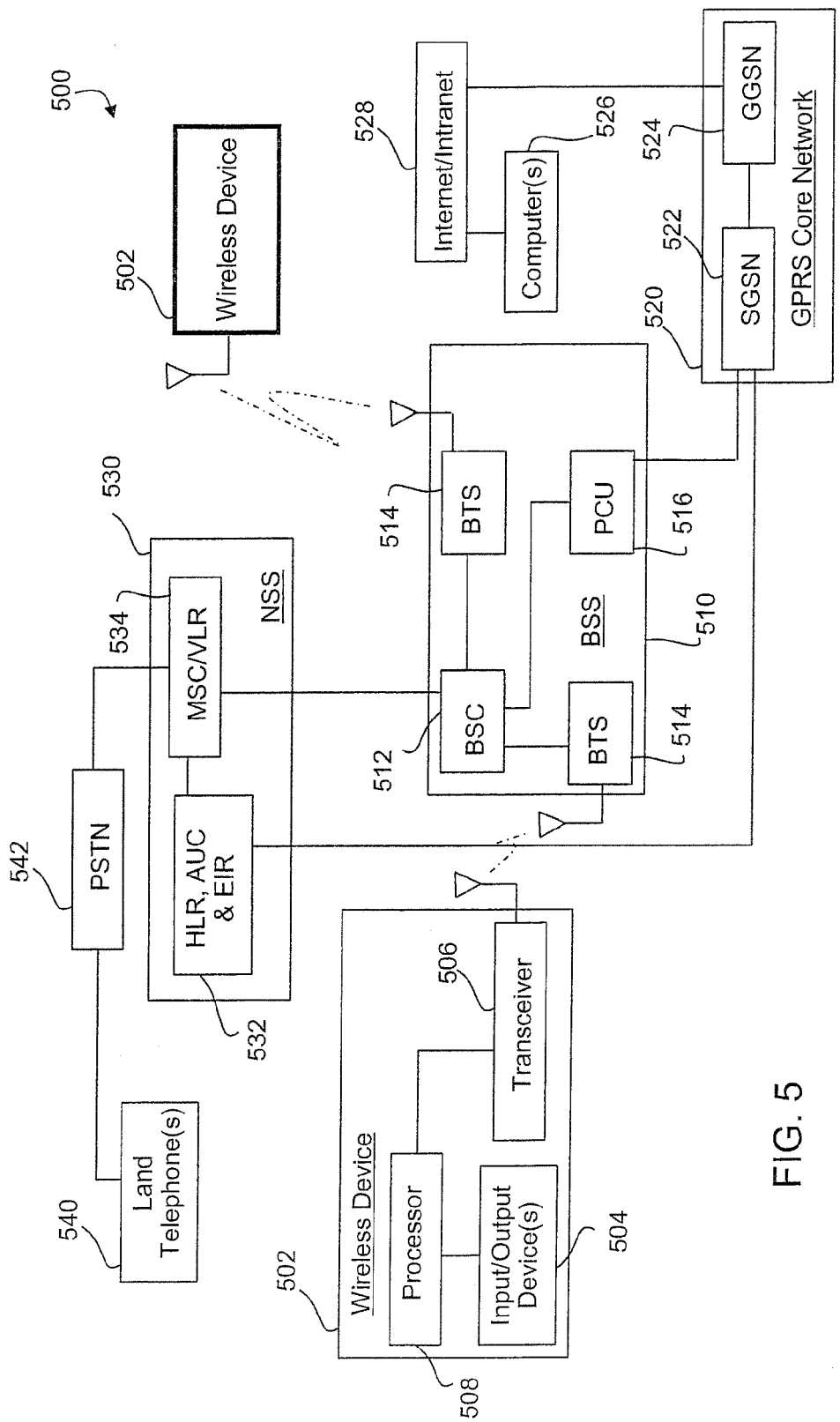
FIG. 5 is a block diagram of an example wireless communication system that may employ an RB mapping technique according to various embodiments of the present disclosure.

In a typical wireless communication system configured according to one or more embodiments of the present disclosure, a scheduler associated with a serving BS (e.g., a network scheduler (included in base station controller (BSC) 512 of FIG. 5) or a scheduler located at a base transceiver station (BTS) 514 of FIG. 5) is configured to schedule a control channel format indicator (CCFI) in a downlink shared control channel (physical downlink control channel (PDCCH)) to indicate a size, e.g., in symbols, of the downlink shared control channel. For example, in a wireless communication system that may transmit up to three symbols in a downlink shared control channel, the CCFI may include two bits that are repeated twelve times in a first symbol of the downlink shared control channel in a protocol dependent location. The control channel symbols may be, for example, orthogonal frequency multiplexing (OFDM) signals. An associated control channel of an SS (included in the downlink shared control channel) may include one or more control channel elements (CEs) that provide various control information to the SS.

The associated control channel may be a downlink control channel, an uplink control channel, or a combined control channel that includes both uplink and downlink assignment information. The scheduler is also configured to schedule the associated downlink control channels for each of the SSs that the scheduler is attempting to serve. In this case, each of the associated downlink control channels includes an explicit SS ID (SS index) that is used in RB mapping, but does not include an RB map. The scheduler is also configured to schedule a shared RB mapping channel in the downlink shared control channel. The shared RB mapping channel is sized based on a system bandwidth and includes a single RB map that is utilized by all of the served SSs to determine associated downlink RBs (i.e., where a given one of the SSs is to receive downlink information). In this embodiment, each of the SSs receives the shared downlink control channel and decodes the CCFI to determine a candidate set (i.e., the number of symbols that are required to be searched) for a search procedure (e.g., a blind search procedure) of the shared downlink control channel. Each of the SSs is configured to detect an associated control channel (indicated by a unique identifier associated with an SS) in the candidate set and is configured to detect an associated SS ID from the associated control channel. Each of the SSs is also configured to use the associated SS ID in conjunction with the RB map (included in the RB mapping channel) to detect one or more associated RBs.

According to one embodiment of the present disclosure, a technique for operating a wireless communication device includes creating a resource block (RB) map by associating respective subscriber station identifications (SS IDs), corresponding to respective subscriber stations (SSs), with one or more RBs (which each include one or more respective subcarriers). The respective SS IDs and the RB map are transmitted, from a serving base station (BS), in one or more control channel symbols.

According to another embodiment of the present disclosure, a technique for operating a wireless communication device includes receiving, at a first subscriber station (SS), one or more control channel symbols, which include respective subscriber station identifications (SS IDs) and a resource block (RB) map. The RB map associates the respective SS IDs with one or more RBs. The respective SS IDs each correspond to respective SSs, which include the first SS. The technique also includes searching, at the first SS, the one or more control channel symbols to detect an associated downlink control channel for the first SS. In this case, the associated downlink control channel for the first SS includes a first SS ID (included within the respective SS IDs).

According to another aspect of the present disclosure, a wireless communication system includes a scheduler coupled to a serving base station (BS). The scheduler is configured to create a resource block (RB) map by associating respective subscriber station identifications (SS IDs), corresponding to respective subscriber stations (SSs), with one or more RBs, which each include one or more respective subcarriers. The BS is configured to transmit the respective SS IDs and the RB map in one or more control channel symbols.

Figure 2:
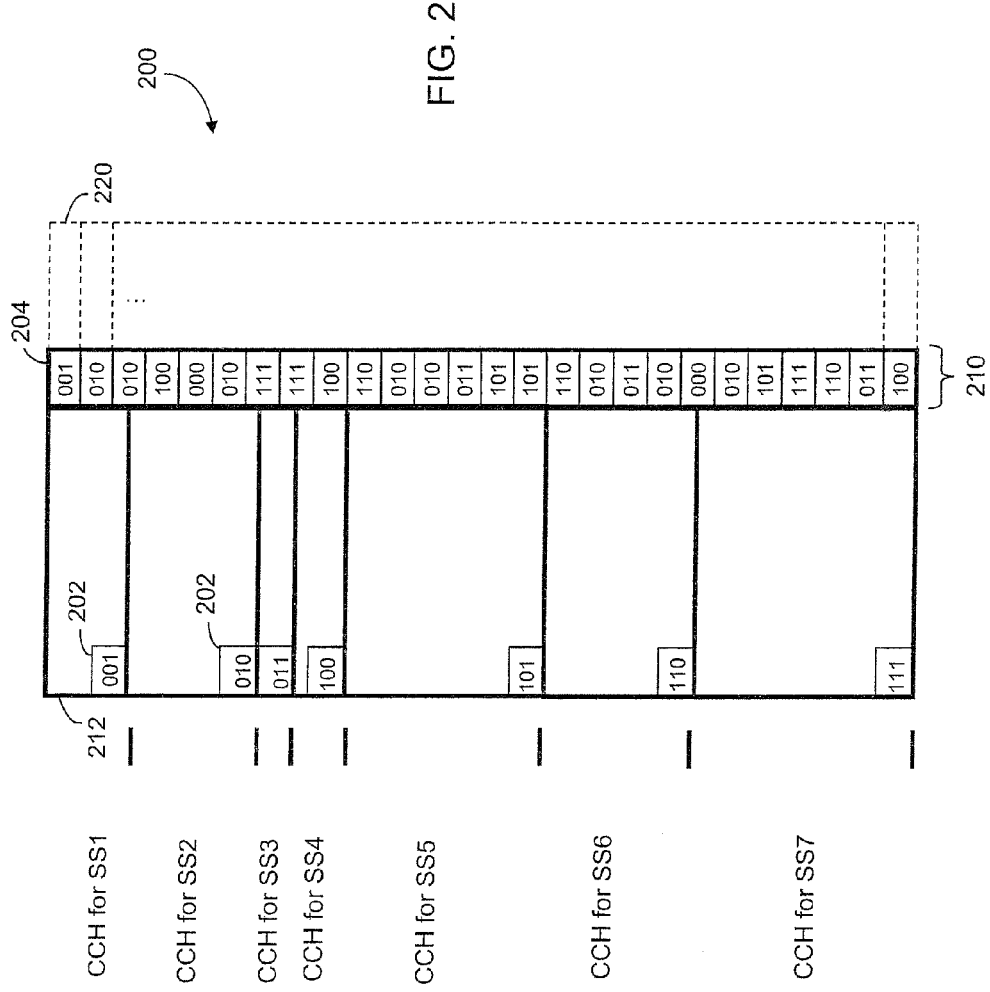
FIG. 2 is an example diagram of a relevant portion of a downlink shared control channel that employs an RB mapping technique, according to the present disclosure.

With reference to FIG. 2, a virtual representation of a relevant portion of a downlink shared control channel 200 is illustrated. In a typical wireless communication system, the downlink shared control channel 200 is located at a beginning of a downlink (DL) subframe that includes multiple downlink shared control channel symbols (e.g., one, two, or three control channel symbols) and multiple data symbols. The control channel symbols (not separately shown in FIG. 2) typically include a number of control channel elements (CEs), each of which include a number of subcarriers, e.g., six subcarriers. Similarly, the data symbols each include a number of resource blocks (RBs) 220 with, for example, twelve subcarriers per RB. It should be appreciated that the CEs and the RBs may have the same size or a different size.

It should also be appreciated that the techniques disclosed herein are broadly applicable to DL subframes of varying sizes and that a control channel may assume an integer value (e.g., 1, 2, 3, etc. symbols) or a fractional value (e.g., 1.5, 2.5, etc. symbols). Transmitters implemented within a wireless communication system, configured according to various embodiments of the present disclosure, may transmit information using a phase shift keying (PSK), a quadrature amplitude modulation (QAM), or other data modulation scheme, depending upon which modulation scheme is scheduled. For example, any of the various PSK (such as pi/2 BPSK, QPSK, and 8-PSK), or QAM (such as 16-QAM and 64-QAM) modulation techniques may be implemented.

According to various aspects of the present disclosure, an associated downlink control channel 212 of each SS does not include an RB map for the entire wireless communication system. That is, in at least one embodiment, the associated downlink control channels 212 of each SS include an associated SS ID 202 that is utilized in conjunction with SS IDs 204, provided via a shared RB mapping channel 210, to assign RBs 220 to each of the SSs. In this embodiment, the shared RB mapping channel 210 provides SS IDs 204 that are each associated with different RBs 220. The SS ID assigned to a given one of the SSs (by a scheduler) may take on virtually any value. More specifically, each of the SSs decodes an associated downlink control channel 212 to determine an assigned SS ID and then use the assigned SS ID to determine which of the RBs 220 are assigned to the SS by decoding the SS IDs 204 in the shared RB mapping channel 210.

In this example, the SS labeled 'SS1' is assigned the SS ID '001', which is assigned one of the RBs 220 (i.e., the RB associated with a top entry of the RB map in the RB mapping channel 210), e.g., twelve subcarrier for an assigned time slot, in the RB map. It should be appreciated that the SS labeled 'SS1' may be assigned a different SS ID and a label for an SS does not necessarily correspond to an SS ID. The RB 220 assigned to the SS1 may correspond to, for example, a voice channel. As another example, the SS labeled 'SS6' is assigned SS ID '110', which is assigned three of the RBs 220 (which may correspond to, for example, a video channel).

The diagram of the downlink shared control channel 200 of FIG. 2 corresponds to an RB mapping technique for a single input multiple output (SIMO) wireless communication system having seven active SSs. In this example, each associated downlink control channel 212 of an SS includes a 3-bit SS ID, which may be located in a protocol dependent location in the associated downlink control channel 212. In this embodiment, assuming one-hundred RBs (only a portion of which are shown in FIG. 2) are to be mapped (e.g., a 20 MHz bandwidth is selected), an RB map is constructed using a total of three-hundred bits (i.e., 100-entries with 3-bits per entry). In this case, three-hundred twenty-one total bits are utilized to perform RB mapping (three bits are transmitted in each of the seven associated downlink control channels 212 and three hundred bits are transmitted in a shared RB mapping channel 210). In contrast, to map seven SSs to one-hundred RBs according to the conventional RB mapping approach described above has required the transmission (from the serving BS to the seven SSs) of seven-hundred RB mapping bits (one-hundred RB mapping bits per SS) in a downlink shared control channel. In this example, the number of RB mapping bits has been reduced by over one-half, which facilitates maintaining frequency selectivity, while generally reducing overhead associated with a downlink shared control channel and generally reducing decoding complexity of the downlink shared control channel.

It should be appreciated that each of the associated downlink control channels 212 shown in FIG. 2 include additional information, e.g., in protocol dependent fields. For example, the additional information may include a hybrid automatic repeat request (HARQ) field, a multiple input multiple output (MIMO) field, among other fields. Moreover, it should be appreciated that the diagram of the downlink shared control channel 200 is simplified, for sake of clarity, and that the various information may be located in any protocol designated field and an associated downlink control channel 212 for a given SS may be positioned in virtually any order within the downlink shared control channel 200.

Figure 3:
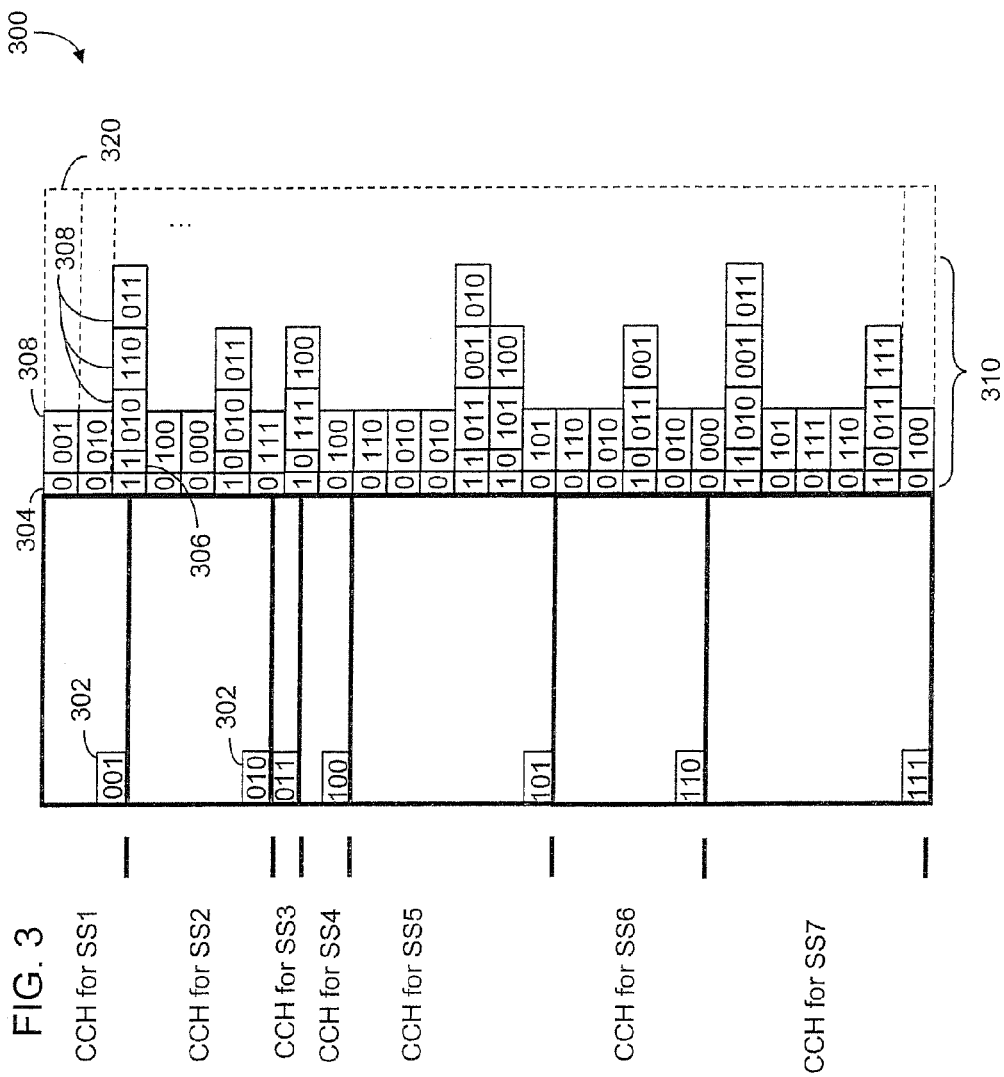
FIG. 3 is an example diagram of a relevant portion of a downlink shared control channel that employs another RB mapping technique, according to the present disclosure.

With reference to FIG. 3, a virtual representation of a relevant portion of a downlink shared control channel 300, configured according to another embodiment of the present disclosure, for a possible multiple user multiple input multiple output (MU-MIMO) configuration is illustrated. As noted above, in a typical wireless communication system, a downlink shared control channel is located at a beginning of a DL subframe that may include multiple downlink shared control channel symbols (e.g., one, two, or three control channel symbols) and multiple data symbols. The control channel symbols typically include a number of control channel elements (CEs), each of which include a number of subcarriers, e.g., six subcarriers. Similarly the data symbols each include a number of RBs 320, with each of the RBs 320 including, for example, twelve subcarriers. It should be appreciated that the CEs and the RBs may have the same size or a different size. It should also be appreciated that the techniques disclosed herein are broadly applicable to DL subframes of varying sizes and that a control channel symbol may assume an integer value or a fractional value.

According to this aspect of the present disclosure, each associated downlink control channel 312 of an individual SS does not include an individual RB map for the entire wireless communication system. In lieu of the individual RB map, each associated downlink control channel 312 includes an SS ID 302 (assigned to an SS by a scheduler) that is utilized in conjunction with information provided in a shared RB mapping channel 310 to assign RBs 320 to an SS. More specifically, each of the SSs decodes an associated downlink control channel 312 to determine an associated SS ID. The associated downlink control channel 312 may be identified by an SS when, for example, a unique identifier (e.g., a unique 16-bit identifier) included in a protocol dependent field within the associated downlink control channel 312 corresponds to the unique identifier assigned (by, for example, a network administrator) to the SS. The SS then uses the SS ID to determine which of the RBs 320 are assigned to the SS using the information in the shared RB mapping channel 310. For example, the SS labeled 'SS1' is assigned the SS ID '001', which is assigned four of the RBs 320 (i.e., an RB associated with a top entry in the shared RB mapping channel 310, an RB associated with a thirteenth entry from the top entry in the shared RB mapping channel 310, an RB associated with an eighteenth entry from the top in the shared RB mapping channel 310, and an RB associated with a twenty-first entry from the top in the RB mapping channel 310), e.g., twelve subcarriers for each RB in an assigned time slot, in the shared RB mapping channel 310.

The RB map provided in the shared RB mapping channel 310 differs from the RB map provided in the shared RB mapping channel 210 in that the shared RB mapping channel 310 includes a first bit field (B0) 304, may include a second bit field (B1) 306, and includes one or more SS IDs 308 that indicate what SS is assigned to an associated RB for each entry in the RB map. The B0 field 304 provides a first indicator as to the number of SSs assigned to a given one of the RBs 320. For example, in one embodiment, if the B0 field 304 includes a digital zero, i.e., '0', either the RB is assigned to one SS or is unassigned (as indicated by the SS ID). For example, the SS ID of '000' may be used to indicate that an RB 320 is unassigned. In this embodiment, if the B0 field includes a digital one, i.e., '1', the RB 320 is assigned to two or more SSs, as indicated by the B1 field 306.

In one embodiment, when the B1 field 306 includes a digital zero, an associated RB 320 is assigned to two SSs (see, for example, the sixth entry from the top in the RB mapping channel 310, which assigns the associated RB 320 to SSs having an SS ID of '010' (SS2) and '011' (SS3). In this embodiment, when the B1 field 306 includes a digital one, an associated RB is assigned to three SSs (see, for example, the third entry from the top in the RB mapping channel 310, which assigns the associated RB to SSs having SS IDs of '010' (SS2), '110' (SS6), and '011' (SS3)). As another example, the SS labeled SS6 (assigned ID '110') is assigned four RBs (associated with the third, tenth, sixteenth, and twenty-fourth entries from the top of the shared RB mapping channel 310).

It should be appreciated that each of the associated downlink control channels 312 include additional information, e.g., in protocol dependent fields. For example, the additional information may include a hybrid automatic repeat request (HARQ) field, a multiple input multiple output (MIMO) field, among other fields. Moreover, it should be appreciated that the diagram of the downlink shared control channel 300 is simplified, for sake of clarity, and that the various information may be located in any protocol designated field and the control channels for a given SS may be positioned any virtually any order within the downlink shared control channel 300. Moreover, the SS IDs that are assigned to a given SS are for illustration only and may be assigned in any order. For example, available SS IDs may be assigned to an SS on a first-come first-served basis. It should be appreciated that the number of bits used to indicate the number of SSs assigned to an RB may be greater than or less than two. In general, an indicator (for providing an indication of the number of SSs assigned to a given RB) may be one or more bits that are assigned to a protocol dependent field in an RB map.

Figure 4:
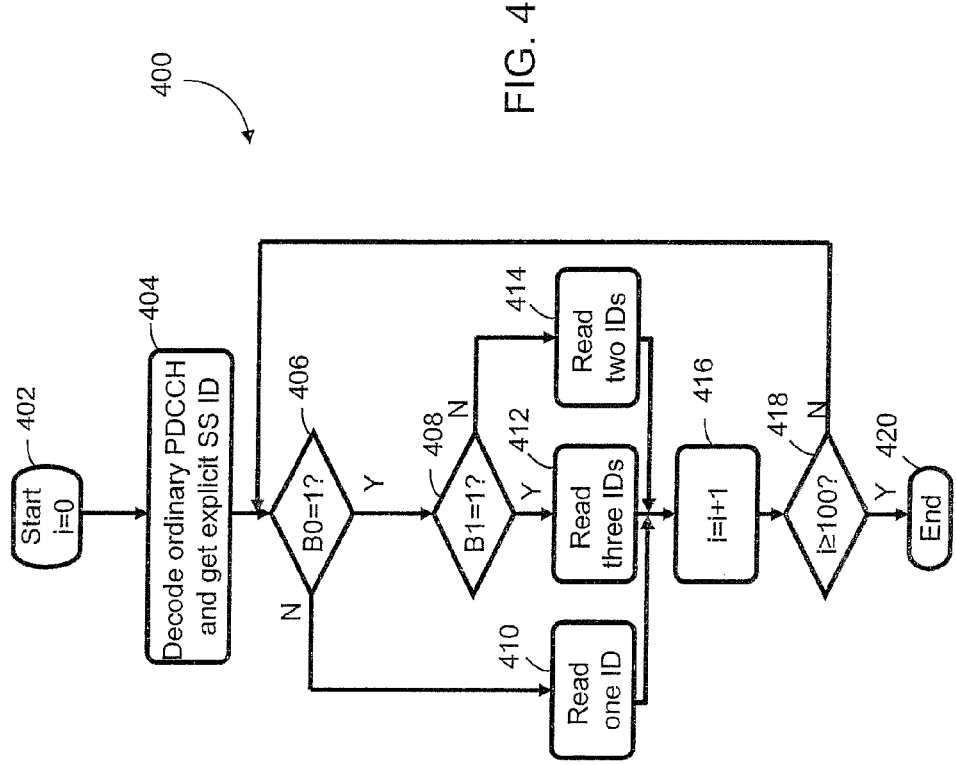
FIG. 4 is a flowchart of an example process for RB mapping according to FIG. 3.

Moving to FIG. 4, an example process 400 (which corresponds to the embodiment of FIG. 3) that is employed by SSs in a wireless communication system, configured according to one or more embodiments of the present disclosure, is illustrated. The process 400 is initiated in block 402, where a variable 'i' is initialized, e.g., set equal to zero. In the process 400, the variable 'i' corresponds to a number of RBs 320 employed in an associated wireless communication system. For example, in a wireless communication system that has a 20 MHz bandwidth, one-hundred RBs (corresponds to twelve-hundred subcarriers in a system that defines an RB as including twelve subcarriers) may be utilized. As another example, in a wireless communication system that has a 10 MHz bandwidth, fifty RBs may be utilized. As yet another example, in a wireless communication system that has a 5 MHz bandwidth, twenty-five RBs may be utilized. Next, in decision block 404, the SS determines whether the B0 field 304 in an associated entry of the RB mapping channel 310 is equal to a digital one. If the B0 field 304 stores a digital one, the SS is configured to check at least two SS IDs in the entry of the RB map to determine whether the SS is to receive downlink information in the associated RB 320 (i.e., to determine whether the SS ID of the SS matches the SS IDs in the entry of the RB map). When the B0 field 304 stores a digital one, control transfers to decision block 408.

If the B0 field 304 stores a digital zero in block 406, the SS is configured to check one SS ID in the entry of the RB map to determine whether the SS is to receive downlink information in the associated RB 320. From block 406, control transfers to block 410, where the SS reads one SS ID to determine whether the SS is to receive downlink information in the associated RB 320. When the B0 field 304 stores a digital one in block 406, control transfers to decision block 408. In block 408, when the B1 field 306 stores a digital one, control transfers to block 412, where the SS reads three SS IDs in the entry of the RB map to determine whether the SS is to receive downlink information in the associated RB 320. When the B1 field 306 stores a digital zero in block 408, control transfers to block 414, where the SS reads two SS IDs in the entry of the RB map to determine whether the SS is to receive downlink information in the associated RB.

Following blocks 410, 412, and 414, control transfers to block 416, where the variable 'i' is incremented by one. Following block 416, control transfers to block 418, where the SS determines whether the variable is greater than or equal to a desired value, in this case one-hundred. If the variable is greater than or equal to one-hundred, control transfers to block 420, where the process 400 terminates. Otherwise, when the variable is not greater than one-hundred in block 418, control transfers to block 406. As noted above, the number of indicators may be expanded to provide an indication that more than three SSs are associated with a given one of the RBs 320. Moreover, it is contemplated that other techniques, which may be utilized to indicate the number of SSs associated with an RB, are well within the ability of those of ordinary skill in the art based upon the disclosure herein.

With reference to FIG. 5, an example wireless communication system 500 is depicted that includes a plurality of wireless devices (subscriber stations) 502, e.g., hand-held computers, personal digital assistants (PDAs), cellular telephones, etc., that may be configured to utilize control channels that include resource block (RB) maps configured according to the present disclosure. In general, the wireless devices 502 include a processor 508 (e.g., a digital signal processor (DSP)) that employs a software system, a transceiver 506, and one or more input/output devices 504 (e.g., a camera, a keypad, display, etc.), among other components not shown in FIG. 5.

As is noted above, according to various embodiments of the present disclosure, the disclosed resource block (RB) mapping techniques generally reduce overhead associated with the transmission of RB maps and generally reduce a time associated with acquiring information on associated RBs for a wireless communication device, such as the wireless devices 502. The wireless devices 502 communicate with a base station controller (BSC) 512 of a base station subsystem (BSS) 510, via one or more base transceiver stations (BTS) 514, to receive or transmit voice, data, or both voice and data. The BSC 512 may, for example, be configured to schedule communications for the wireless devices 502. Alternatively, the BTS 514 may schedule communications for the wireless devices 502 in which the BTS 514 is in communication. In either case, a scheduler typically employs one or more processors (that execute a software system) to schedule communications.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the wireless devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSC/VLR) 534, which is in communication with a home location register (HLR), an authentication center (AUC), and an equipment identity register (FIR) 532. In a typical implementation, the MSC/VLR 534 and the HLR, AUC, and EIR 532 are located within a network and switching subsystem (NSS) 530, which may also perform scheduling for the system 500. The SGSN 522 may communicate directly with the HLR, AUC and FIR 532. As is also shown, the MSC/VLR 534 is in communication with a public switched telephone network (PSTN) 542, which facilitates communication between wireless devices 502 and land telephones 540. It should be appreciated that other types of wireless systems, having different configurations, may implement various aspects of the RB mapping techniques disclosed herein.

Figure 6:
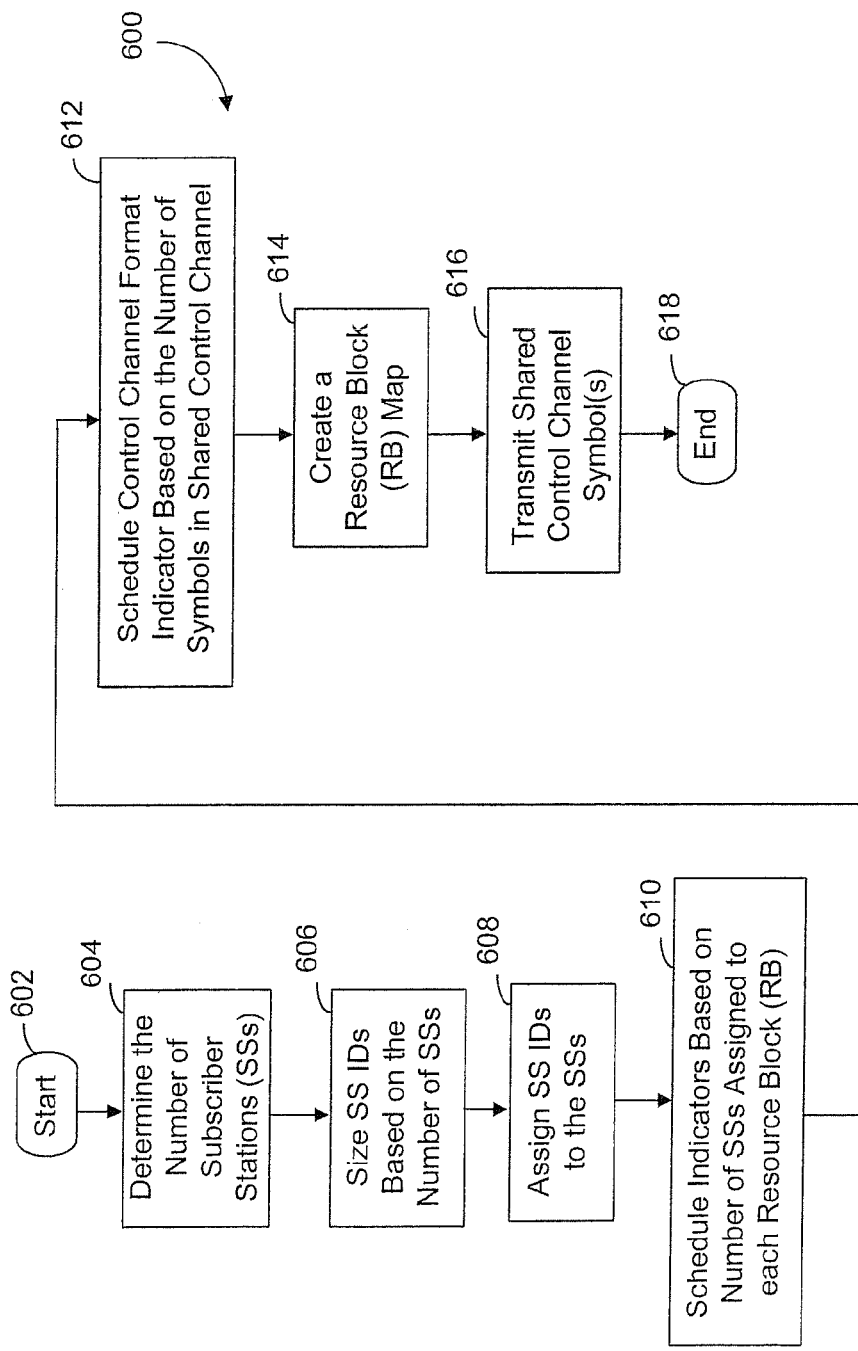
FIG. 6 is a flowchart of an example process, employed in a scheduler/serving base station (BS), for RB mapping according to another aspect of the present disclosure.

With reference to FIG. 6, an example process 600 for resource block (RB) mapping in a scheduler is depicted. To aid in understanding, the process 600 is described in conjunction with FIGS. 3 and 5. The scheduler may be a network scheduler (e.g., located at the BSC 512 of FIG. 5) or may be incorporated within a serving base station (BS) (e.g., the BTS 514 of FIG. 5). In block 602, the process 600 is initiated, at which point control transfers to block 604, where the scheduler determines the number of subscriber stations (SSs) that are to be served by the serving BS. Next, in block 606, the scheduler sizes a bit size of SS identifications (IDs) based on the number of the respective SSs. For example, if the serving BS is serving seven SSs, 3-bits may be used in the SS IDs. Alternatively, the scheduler may be configured to schedule for a fixed number of SSs. In this case, blocks 604 and 606 may be omitted. Then, in block 608, the SS IDs are assigned to respective SSs. The SS IDs may be assigned to an SS, for example, on a first-come first-served basis from an available free-pool of SS IDs.

Next, in block 610, respective indicators (e.g., the indicators 304 and 306) are scheduled based on the number of SSs assigned to each of the RBs 320. For example, if three SSs are assigned to each of the RBs 320 in a MU-MIMO mode, the respective indicators may include two bits for at least some of the RBs 320 (e.g., RBs that have more than one assigned SS). In one embodiment, at least one of the respective indicators includes one bit and remaining ones of the respective indicators includes multiple bits. In another embodiment, the respective indicators include one bit when none or one of the SSs are assigned to an associated one of the one or more RBs and two or more bits when two or more of the SSs are assigned to an associated one of the one or more RBs. In another embodiment, the respective indicators each include multiple bits.

Then, in block 612, a control channel format indicator (CCFI) is scheduled in a first one of the one or more control channel symbols. The CCFI, which may be located in a protocol dependent field (not shown), provides an indication of a number of symbols in the shared downlink control channel, which an SS decodes to determine the number of symbols that is to be searched for an associated downlink control channel (e.g., the associated downlink control channel 312 for the SS labeled SS1). Next, in block 614, an RB map (e.g., the RB map in the shared RB mapping channel 310) is created by associating respective SS IDs 302, corresponding to respective SSs, with one or more of the RBs 320.

In a typical case each of the RBs 320 includes one or more respective subcarriers, e.g., twelve subcarriers. Then, in block 616, the serving BS transmits the respective SS IDs and the RB map in one or more control channel symbols. In one or more embodiments, the SS IDs 302 are transmitted in respective downlink control channels 312 of the respective SSs and the RB map is transmitted in the shared RB mapping channel 310. The one or more control channel symbols may include an assigned uplink, an assigned downlink, or both the assigned uplink and downlink for the respective SSs. The one or more control channel symbols may be, for example, orthogonal frequency division multiplexing (OFDM) signals.

Figure 7:
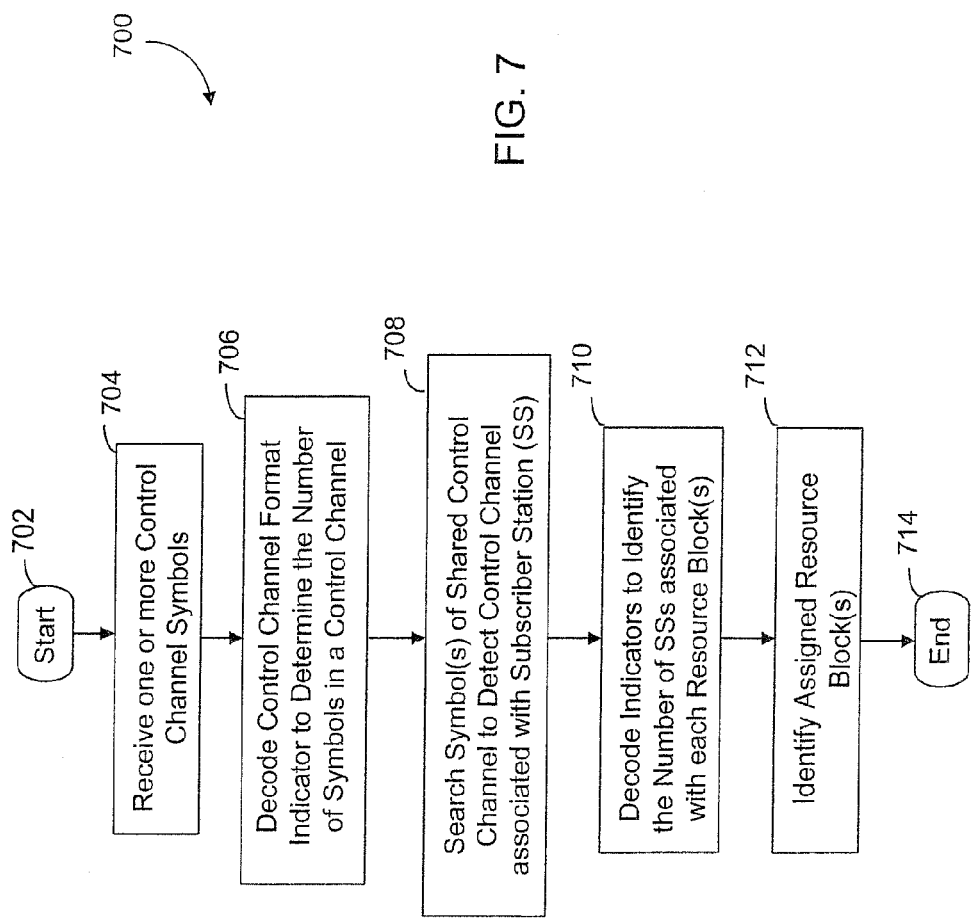
FIG. 7 is a flowchart of an example process, employed at an SS, for RB map decoding according to another aspect of the present disclosure.

With reference to FIG. 7, a process 700 is illustrated that is employed by an SS to determine assigned RBs. To aid in understanding, the process 700 is described in conjunction with FIGS. 3 and 5. In block 702 the process 700 is initiated, at which point control transfers to block 704. In block 704, one or more control channel symbols (including the downlink shared control channel 300) are received at an SS. The one or more control channel symbols include respective SS IDs 302 (located in the associated downlink control channels 312), a control channel format indicator (CCFI), and a shared RB map, which associates the respective SS IDs 302 with one or more RBs 320. The respective SS IDs 302 each corresponds to respective SSs and each of the one or more RBs 320 includes one or more respective subcarriers. The SS decodes the CCFI (which is located in a protocol dependent field (not shown) of the downlink shared control channel 300) to determine a candidate set for a search procedure of the one or more control channel symbols (i.e., to determine how many symbols are in the downlink shared control channel 300).

Next, in block 708, the one or more control channel symbols are searched (using, for example, a blind search procedure of the downlink shared control channel 300) to detect an associated downlink control channel 312 for the SS (identified by a unique identifier assigned to the SS). The associated downlink control channel 312 for the SS includes an SS ID 302 for the SS. Then, in block 710, respective indicators 304 and 306 (associated with the one or more RBs 320) in the RB map are decoded to determine a total number of the respective SSs assigned to an associated one of the one or more RBs 320. Entries of the RB map are then searched for the SS ID 302 based on the respective indicators 304 and 306. Finally, in block 712, assigned ones of the RBs 320 for the SS are identified by the SS based on the RB map and the SS ID 302, such that the SS may receive downlink information in the assigned ones of the RBs 320. Following block 712, the process 700 terminates in block 714.

According to another aspect of the present disclosure, a shared multiple input multiple output (MIMO) control channel is employed to further reduce scheduling overhead (at a scheduler) and search time (at an SS). In one embodiment, entries in a shared MIMO control channel are associated with respective resource blocks of the transmission channel, which may be arranged in a predefined index sequence. In another embodiment, entries in a shared MIMO control channel are associated with entries in a shared resource block (RB) mapping channel. According to one embodiment, a subscriber station (SS) first decodes an associated control channel to determine an RB assignment and non-MIMO related control information. The SS then utilizes the RB assignment to decode RB specific MIMO control information for each assigned RB. According to at least one embodiment, the MIMO control information (e.g., a precoding matrix index, assigned layer information, transmission rank information) for each RB is encoded in a shared MIMO control channel, whose sequence corresponds to a predefined index sequence or a sequence utilized in an RB map provided in a shared RB mapping channel. As the MIMO control information is mapped according to a predefined index sequence or the RB map sequence, the number of bits required to provide MIMO control information to an SS is generally reduced. For RBs that do not utilize a MIMO mode (e.g., RBs that utilized SIMO mode), an indicator may be transmitted in the RB map that indicates an associated RB is not a MIMO RB.

Figure 8:
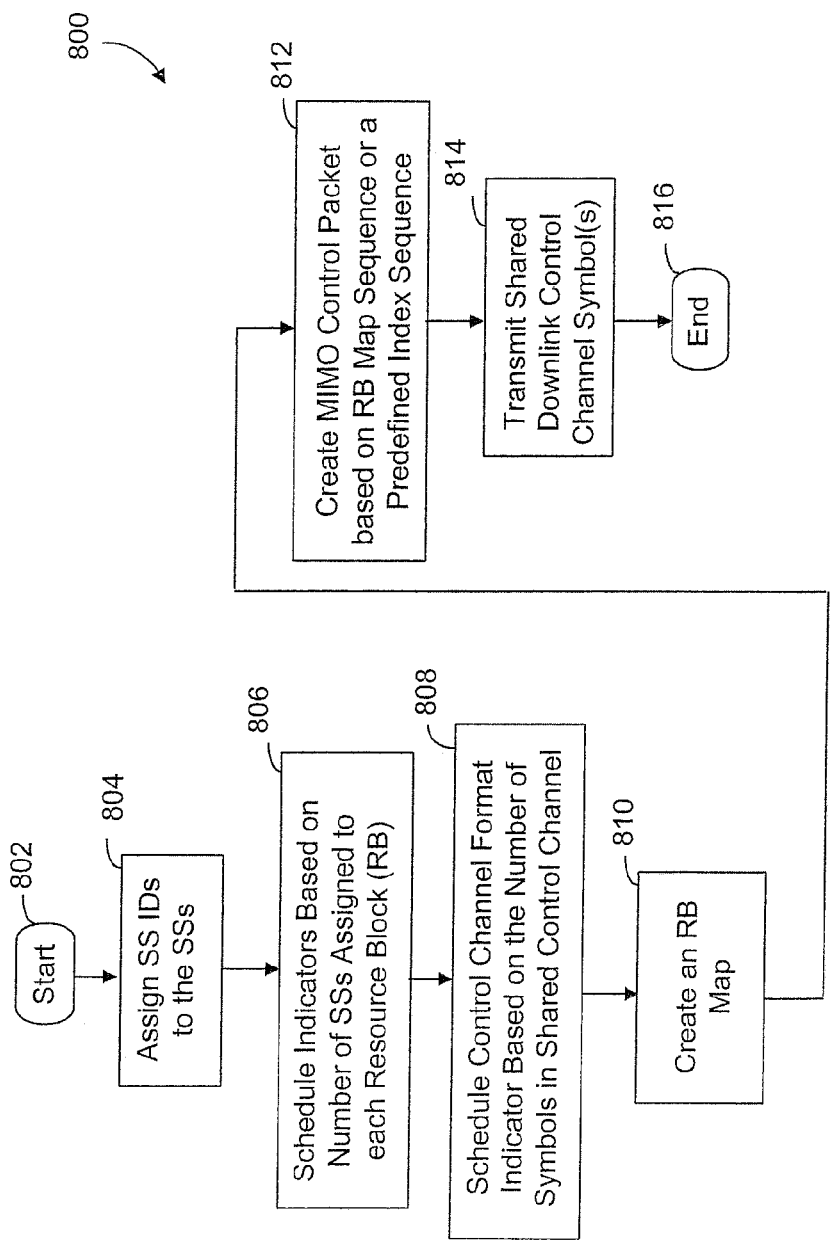
FIG. 8 is a flowchart of an example process, employed in a scheduler/serving base station (BS), for RB mapping and multiple input multiple output (MIMO) control packet scheduling according to another aspect of the present disclosure.

With reference to FIG. 8, an example process 800 for resource block (RB) mapping and multiple input multiple output (MIMO) control information scheduling is depicted. The scheduler may be a network scheduler (e.g., the BSC 512 of FIG. 5) or may be incorporated within a serving base station (BS), e.g., the BTS 514 of FIG. 5. In block 802, the process 800 is initiated, at which point control transfers to block 804, where a scheduler assigns the subscriber station identifications (SS IDs) 302 to respective SSs.

Next, in block 806 respective indicators (e.g., the indicators 304 and 306 of FIG. 3) are scheduled based on the number of SSs assigned to each of the RBs 320. For example, if three SSs are assigned to each of the RBs 320 in a MU-MIMO mode, the respective indicators may include two bits for at least some of the RBs 320 (e.g., RBs that have more than one assigned SS). In one embodiment, at least one of the respective indicators includes one bit and remaining ones of the respective indicators includes multiple bits. In another embodiment, the respective indicators include one bit when none or one of the SSs are assigned to an associated one of the one or more RBs 320 and two or more bits when two or more of the SSs are assigned to an associated one of the one or more RBs 320. In another embodiment, the respective indicators each include multiple bits.

Then, in block 808, a control channel format indicator (CCFI) is scheduled in a first one of the one or more control channel symbols. The CCFI (not shown) provides an indication of a number of symbols in the shared downlink control channel 300, which an SS decodes to determine the number of symbols that is to be searched (using, for example, a blind search procedure) for an associated downlink control channel 312. Next, in block 810, an RB map is created by associating respective SS IDs 302, corresponding to respective SSs, with one or more of the RBs 320. In a typical case each of the RBs 320 includes one or more respective subcarriers, e.g., twelve subcarriers. Following block 810, in block 812, a MIMO control packet is created by associating MIMO control information with related information in the RB map or to a predefined index sequence. That is, in one embodiment, the MIMO control information is sequenced according to the RBs 320 in the RB map and in another embodiment the MIMO control information is sequenced according to a predefined index sequence.

Then, in block 814, the serving BS transmits the respective SS IDs 302, the RB map, and the MIMO control information in one or more control channel symbols. In one or more embodiments, the SS IDs 302 are transmitted in respective downlink control channels 312 of the respective SSs, the RB map is transmitted in a shared RB mapping channel 310, and the MIMO control packet is transmitted in a shared MIMO control channel. The one or more control channel symbols may include an assigned uplink, an assigned downlink, or both the assigned uplink and downlink for the respective SSs. The one or more control channel symbols may be, for example, orthogonal frequency division multiplexing (OFDM) signals.

Figure 9:
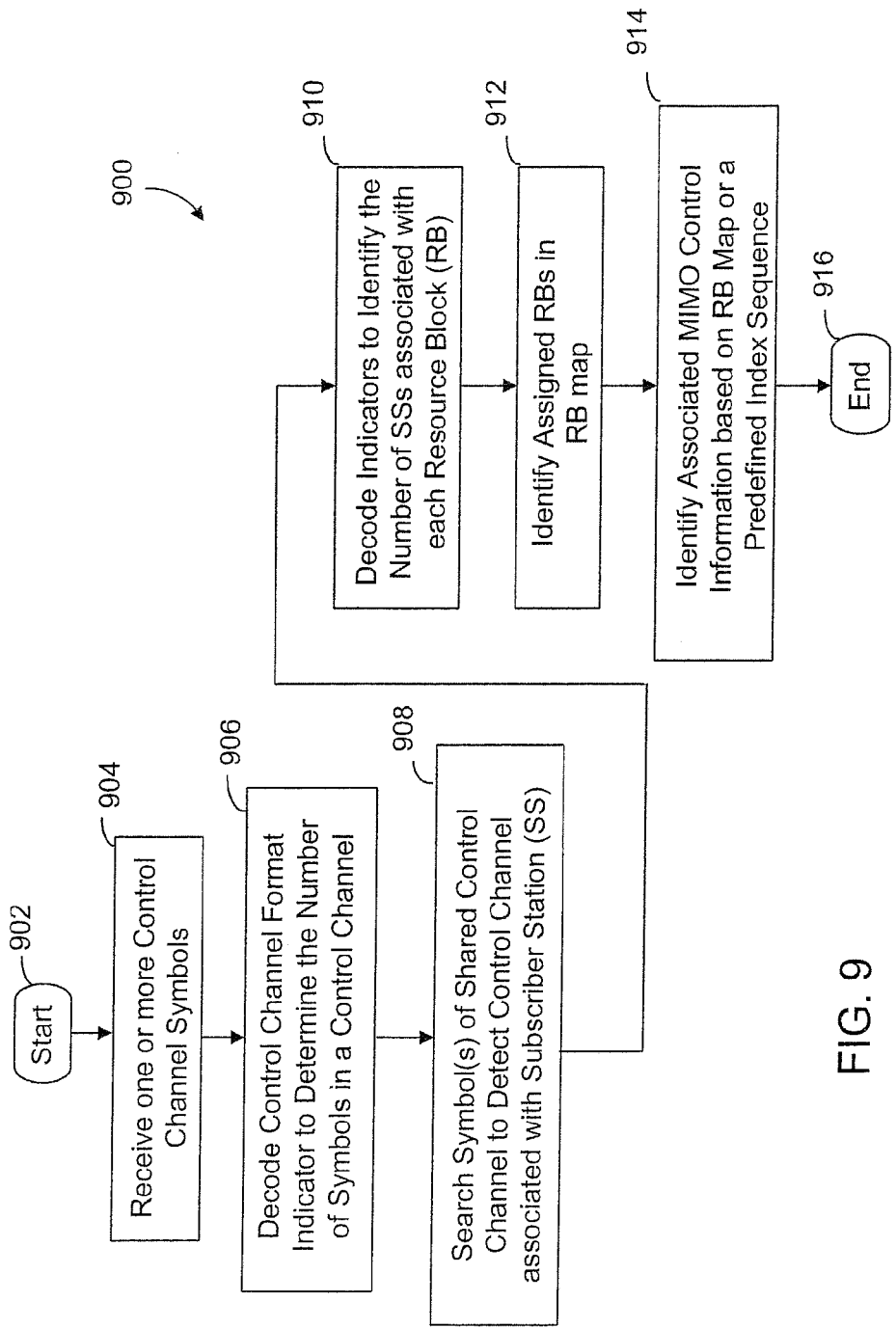
FIG. 9 is a flowchart of an example process, employed at an SS, for RB mapping and MIMO control packet decoding according to another aspect of the present disclosure.

With reference to FIG. 9, a process 900 is illustrated that is employed by an SS to determine assigned RBs and related MIMO control information. The process 900 is similar to the process 700 of FIG. 7. In block 902 the process 900 is initiated, at which point control transfers to block 904. In block 904, one or more control channel symbols are received at an SS. The one or more control channel symbols include respective SS IDs (located in associated downlink control channels 312), a control channel format indicator (CCFI), a shared RB map (which associates the respective SS IDs 302 with one or more RBs 320) and a MIMO control packet, among other information. The respective SS IDs 302 each corresponds to respective SSs and each of the one or more RBs 320 includes one or more respective subcarriers. The SS decodes the CCFI to determine a candidate set for a search procedure of the one or more control channel symbols (i.e., to determine how many symbols are in the downlink shared control channel 300).

Next, in block 908, the one or more control channel symbols are searched (using, for example, a blind search procedure) to detect an associated one of the downlink control channels 312 for the SS. The associated downlink control channel 312 for the SS includes the SS ID 302 for the SS. Then, in block 910, respective indicators (e.g., the indicators 304 and 306) associated with the one or more RBs 320 in the RB map are decoded to determine a total number of the respective SSs assigned to an associated one of the one or more RBs 320. Entries of the RB map are then searched for the SS ID 302 based on the respective indicators. Next, in block 912, assigned RBs of the SS are identified by the SS based on the RB map and the SS ID 302, such that the SS may receive downlink information in assigned ones of the RBs 320. Then, in block 914, associated MIMO control information is identified based on the RB map (as the MIMO control information is sequenced according to the RBs 320 in the RB map). In another embodiment, in block 914, associated MIMO control information is identified by the subscriber station for its assigned resource block, where the RB assignment is done by some other mechanism instead of the RB map. Following block 914, the process 900 terminates in block 916.

Accordingly, a number of techniques have been disclosed herein that generally reduce overhead associated with resource block mapping in a wireless communication system without adversely affecting frequency selectivity.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. For example, scheduling software that implements the process 600 of FIG. 6 may be stored at a scheduler (located at the BSC 512 or the BTS 514 of FIG. 5). As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer progam(s) coded in accordance with the present disclosure.

Although the invention is described herein with reference to specific embodiments, various modifications and changes can be made without departing from the scope of the present invention as set forth in the claims below. For example, the resource block mapping techniques disclosed herein are generally broadly applicable to wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a wireless network, comprising:
   creating a resource block map by associating subscriber station identifications, corresponding to respective subscriber stations, with one or more resource blocks;
   scheduling indicators in the resource block map for resource blocks assigned more than one respective subscriber station, each of the indicators being associated with one of the one or more resource blocks and indicating a total number of respective subscriber stations assigned to an associated one of the one or more resource blocks;
   transmitting the respective subscriber station identifications in one or more control channel symbols; and
   transmitting the resource block map in a shared resource block mapping channel.

2. The method of claim 1, where the shared resource block map indicates when a first of the one or more resource blocks are assigned to multiple associated subscriber station identifiers.

3. The method of claim 1, where the shared resource block map indicates when a first of the one or more resource blocks are assigned to only one associated subscriber station identifiers.

4. The method of claim 1, where the respective control channel comprises a protocol dependent field.

5. The method of claim 1, where the at least one associated subscriber station identifier is unique.

6. The method of claim 1, where the at least one associated subscriber station on a first-come-first-served basis.

7. The method of claim 1, where a length of the at least one associated subscriber station identifier is determined based at least in part on a number of subscriber stations associated with a base station.

8. The method of claim 1, where the wireless network comprises an orthogonal frequency division multiple access (OFDMA) network.

9. The method of claim 8, wherein the respective control channel occupies less than an entire system bandwidth of the OFDMA network.

10. A serving apparatus, comprising:
    a wireless interface configured to communicate with a population of subscriber station devices;
    a processor; and
    a computer readable apparatus having a storage medium with at least one computer program stored thereon, the at least one computer program configured to, when executed on the processor:
      create a resource block map configured to assign subscriber station identifications that correspond to respective subscriber stations to one or more resource blocks;
      schedule indicators in the resource block map for resource blocks assigned more than one respective subscriber station, each of the indicators being associated with one of the one or more resource blocks and indicating a total number of respective subscriber stations assigned to an associated one of the one or more resource blocks;
      transmit the respective subscriber station identifications in one or more control channel symbols; and
      transmit the resource block map in a shared resource block mapping channel.

11. A method of operating a wireless network, comprising:
    creating a resource block map by at least associating subscriber station identifications, corresponding to respective subscriber stations, with one or more resource blocks;
    scheduling indicators in the resource block map for resource blocks assigned more than one respective subscriber station, each of the indicators being associated with one of the one or more resource blocks and relating to a total number of respective subscriber stations assigned to an associated one of the one or more resource blocks;
    transmitting the respective subscriber station identifications in one or more control channel symbols; and
    transmitting the resource block map via a shared resource block mapping channel.

12. A serving apparatus, comprising:
a wireless interface configured to communicate with a population of subscriber station devices;
a processor; and
a computer readable apparatus in data communication with the processor and having a storage medium with at least one computer program stored thereon, the at least one computer program configured to, when executed on the processor:
create a resource block map configured to assign subscriber station identifications that correspond to respective subscriber stations to one or more resource blocks;
schedule indicators in the resource block map for resource blocks assigned more than one respective subscriber station, each of the indicators being associated with one of the one or more resource blocks and indicating a total number of respective subscriber stations assigned to an associated one of the one or more resource blocks;
transmit the respective subscriber station identifications in one or more control channel symbols; and
transmit the resource block map using a shared resource block mapping channel.

* * * * *